(12) United States Patent
Clerc et al.

(10) Patent No.: US 8,996,667 B2
(45) Date of Patent: Mar. 31, 2015

(54) DEPLOYING AN OPERATING SYSTEM

(75) Inventors: David Clerc, Verbier (CH); Jacques Fontignie, Onex (CH); Luis Garces-Erice, Zurich (CH); Claudio Marinelli, Latina (IT); John G. Rooney, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 13/083,217

(22) Filed: Apr. 8, 2011

(65) Prior Publication Data
US 2011/0264776 A1 Oct. 27, 2011

(30) Foreign Application Priority Data

Apr. 27, 2010 (EP) .................................... 10425138

(51) Int. Cl.
G06F 15/177 (2006.01)
G06F 9/445 (2006.01)
G06F 9/44 (2006.01)

(52) U.S. Cl.
CPC ................ *G06F 9/4416* (2013.01); *G06F 8/63* (2013.01)
USPC ........................................................ 709/222

(58) Field of Classification Search
CPC ...... H04L 63/04; H04L 65/4069; H04L 65/60
USPC .................... 709/220, 222, 231; 718/1; 713/2
See application file for complete search history.

(56) References Cited

U.S. PATENT DOCUMENTS

| 6,098,158 A | 8/2000 | Lay et al. |
| 6,567,774 B1 | 5/2003 | Lee et al. |
| 6,857,069 B1 | 2/2005 | Rissmeyer et al. |
| 6,920,555 B1 | 7/2005 | Peters et al. |

(Continued)

FOREIGN PATENT DOCUMENTS

| CA | 2817109 A1 | 6/2012 |
| CN | 101256527 A | 9/2008 |

(Continued)

OTHER PUBLICATIONS

Black, "Streaming Execution Mode," Application Streaming with VMware® ThinApp™, Jun. 2009 Information Guide, VMware, Inc.

(Continued)

*Primary Examiner* — Vivek Srivastava
*Assistant Examiner* — Karina J Garcia-Ching
(74) *Attorney, Agent, or Firm* — Steven L. Nichols; Van Cott, Bagley, Cornwall & McCarthy P.C.

(57) ABSTRACT

A method for deploying an operating system onto a client system includes, with the client system, receiving a bootloader image from an external device in response to a request for the bootloader image and installing the bootloader. The installed bootloader is configured to provide a streaming function from the client system to both a client repository of the client system and a remote data repository and selectively redirect requests for a block of data to one of: the client repository and the remote data repository. The method further includes, with the client system, during operation of a function of the operating system, making a request for a data block of the operating system, the data block including the function, and receiving the data block from one of: the client repository and the remote repository based on availability information.

26 Claims, 2 Drawing Sheets

(56) References Cited

U.S. PATENT DOCUMENTS

| | | | |
|---|---|---|---|
| 6,925,533 B2 | 8/2005 | Lewis | |
| 6,973,447 B1 | 12/2005 | Aguilar et al. | |
| 7,062,517 B2 | 6/2006 | Kodama | |
| 7,103,747 B2* | 9/2006 | Wilson et al. | 711/206 |
| 7,269,722 B1 | 9/2007 | Neary | |
| 7,360,072 B1 | 4/2008 | Soltis et al. | |
| 7,379,982 B2 | 5/2008 | Tabbara | |
| 7,428,636 B1 | 9/2008 | Waldspurger et al. | |
| 7,490,197 B2* | 2/2009 | Kirshenbaum et al. | 711/112 |
| 7,509,530 B2 | 3/2009 | Welts | |
| 7,512,833 B1 | 3/2009 | Murphy et al. | |
| 7,614,050 B2 | 11/2009 | Sasaki et al. | |
| 7,653,794 B2 | 1/2010 | Michael et al. | |
| 7,664,834 B2* | 2/2010 | Keith, Jr. | 709/220 |
| 7,809,919 B2 | 10/2010 | Thompson | |
| 8,112,505 B1 | 2/2012 | Ben-Shaul et al. | |
| 8,230,095 B2* | 7/2012 | Tsui et al. | 709/231 |
| 8,510,352 B2 | 8/2013 | Mehra et al. | |
| 8,527,728 B2 | 9/2013 | Clerc et al. | |
| 2002/0073201 A1 | 6/2002 | French et al. | |
| 2003/0126242 A1 | 7/2003 | Chang | |
| 2003/0191623 A1 | 10/2003 | Salmonsen | |
| 2003/0225986 A1 | 12/2003 | Teshima | |
| 2004/0010708 A1 | 1/2004 | Johnson et al. | |
| 2004/0010787 A1 | 1/2004 | Traut et al. | |
| 2004/0030822 A1 | 2/2004 | Rajan et al. | |
| 2004/0088367 A1 | 5/2004 | Reinke | |
| 2004/0268345 A1 | 12/2004 | Lodwick et al. | |
| 2005/0160150 A1 | 7/2005 | Kao | |
| 2006/0031547 A1 | 2/2006 | Tsui et al. | |
| 2006/0080385 A1 | 4/2006 | Blandford et al. | |
| 2007/0220494 A1 | 9/2007 | Spooner | |
| 2008/0010639 A1 | 1/2008 | Bestmann | |
| 2008/0027950 A1 | 1/2008 | Fukumi | |
| 2008/0040714 A1 | 2/2008 | Wheeler et al. | |
| 2008/0133208 A1 | 6/2008 | Stringham | |
| 2008/0141015 A1* | 6/2008 | Chalemin et al. | 713/2 |
| 2008/0155245 A1 | 6/2008 | Lipscombe et al. | |
| 2008/0256219 A1 | 10/2008 | Zhang et al. | |
| 2008/0301425 A1 | 12/2008 | Mittapalli et al. | |
| 2009/0037649 A1 | 2/2009 | Xu | |
| 2009/0049160 A1 | 2/2009 | Cherian et al. | |
| 2009/0193245 A1 | 7/2009 | Isaacson | |
| 2009/0240953 A1 | 9/2009 | Paul | |
| 2010/0037235 A1 | 2/2010 | Larimore et al. | |
| 2010/0138827 A1* | 6/2010 | Frank et al. | 718/1 |
| 2010/0174894 A1 | 7/2010 | Chen et al. | |
| 2010/0205594 A1 | 8/2010 | Jirka | |
| 2011/0219372 A1 | 9/2011 | Agrawal et al. | |
| 2011/0231844 A1 | 9/2011 | Ben-Shaul et al. | |
| 2011/0264776 A1 | 10/2011 | Clerc et al. | |
| 2012/0151202 A1 | 6/2012 | Clerc et al. | |
| 2012/0311564 A1 | 12/2012 | Khalid | |
| 2013/0024680 A1 | 1/2013 | Heidingsfeld et al. | |
| 2013/0179856 A1 | 7/2013 | Lam | |
| 2013/0219161 A1 | 8/2013 | Fontignie et al. | |
| 2013/0232329 A1 | 9/2013 | Marinelli et al. | |
| 2013/0247020 A1 | 9/2013 | Fontignie et al. | |

FOREIGN PATENT DOCUMENTS

| | | |
|---|---|---|
| CN | 102567042 | 7/2012 |
| CN | 102591675 | 7/2012 |
| CN | 103221921 | 7/2013 |
| CN | 103250134 | 8/2013 |
| CN | 103250163 | 8/2013 |
| DE | 112011103880 | 8/2013 |
| DE | 112011104325 | 9/2013 |
| DE | 112011104356 B4 | 5/2014 |
| EP | 0770950 A2 | 5/1997 |
| GB | 2499956 | 9/2013 |
| GB | 2499964 B | 12/2013 |
| GB | 2499963 B | 3/2014 |
| JP | 2008003815 A | 1/2008 |
| JP | 2012128839 | 7/2012 |
| JP | 2012128841 | 7/2012 |
| JP | 2013543192 A | 11/2013 |
| JP | 2013545204 A | 12/2013 |
| JP | 2014505286 A | 2/2014 |
| SG | 158757 A1 | 2/2010 |
| WO | 0291099 A2 | 11/2002 |
| WO | 2008049008 A2 | 4/2008 |
| WO | 2008115012 A1 | 9/2008 |
| WO | 2012069297 A1 | 5/2012 |
| WO | 2012076266 A1 | 6/2012 |
| WO | 2012079864 | 6/2012 |

OTHER PUBLICATIONS

Clerc et al., "Deploying an operating system," Filed on Apr. 27, 2010, p. 1-26, E.P. Patent Application No. 10425138.4.

Clerc et al., "Management of Multiple Software Images With Relocation of Boot Blocks," Filed on Dec. 14, 2010, p. 1-49, E.P. Patent Application No. 10194866.9.

Clerc et al., "Management of multiple software images with shared memory blocks," Filed on Dec. 14, 2010, p. 1-49, E.P. Patent Application No. 10194864.4.

EDP Weekly, "Sanrad and emBoot team to deliver iSCSI diskless boot," EDP Weekly's IT Monitor, Jul. 18, 2005, Millin Publishing, Inc., Gale Group, http://www.thefreelibrary.com/_/print/PrintArticle.aspx?id=134957464, Accessed on: Apr. 22, 2010.

Etherboot.Org, "Etherboot/gPXE Wiki," the Etherboot Project Community, Last modified: Mar. 3, 2011, http://etherboot.orglwiki/index.php, Accessed on: Oct. 3, 2014.

Fegreus, "Real Magic with Virtual Snapshots," Open Mag, Mar. 3, 2008, http://www.open-mag.com/100348.shtml, Accessed on: Apr. 22, 2010.

Fontignie et al., "Direct Migration of Software Images With Steaming Technique," Filed on Nov. 23, 2010, p. 1-38, E.P. Patent Application No. 10192219.3, Attorney Docket No. FR920100039EP1.

Fontignie et al., "Computer-readable storage mediums for encrypting and decrypting a virtual disc," Filed on Dec. 09, 2010, p. 1-41, E.P. Patent Application No. 101944001, Attorney Docket No. FR920100042EP1.

Fontignie et al., "Upgrade of Software Images Based on Streaming Techniqhe," Filed on Dec. 13, 2010, p. 1-39, E.P. Patent Application No. 101947091, Attorney Docket No. FR920100018EP1.

Fontignie et al., "Computer-Readable Storage Mediums for Encrypting and Decrypting a Virtual Disc," Filed on Nov. 3, 2011, p. 1-41, I.N. Patent Application No. 4481/CHENP/2013, Attorney Docket No. FR920100042IN1.

Fontignie et al., "Upgrade of Software Images Based on Streaming Technique," Filed on May 24, 2013, p. 1-42, U.S. Appl. No. 13/989,673, Attorney Docket No. FR920100018US1.

Fontignie et al., "Encrypting and Decrypting a Virtual Disc," Filed on Sep. 08, 2014, p. 1-28, U.S. Appl. No. 14/479,475, Attorney Docket No. FR920100042US2.

Fontignie et al., "Upgrade of Software Images Based on Streaming Technique," Filed on Sep. 25, 2014, p. 1-43, U.S. Appl. No. 14/496,353, Attorney Docket No. FR920100018US2.

HP, "HP Image Manager," Product documentation, May 27, 2009, Version 4, Hewlett-Packard Development Company, L.P. http://www8.hp.com/h20195/v2/GetHTMLaspx?docname=c04140545, Accessed on: Oct. 3, 2014.

IBM, "iBoot - Remote Boot over iSCSI," Storage Research, https://www.research.ibm.com/haifa/projects/storage/ibootl index.html, Accessed on: Oct. 3, 2014.

IBM System X, "BladeBoot San Guide," Software-Based iSCSI Boot San Guide for IBM Blades, Jun. 6, 2008, Version 2.02, IBM Corp.

Madden, "A better way to manage Citrix servers: Centralized block-level disk image streaming," Block-level Disk Streaming for Citrix Servers, Mar. 2006.

(56) References Cited

OTHER PUBLICATIONS

Ni et al., "Security enhanced virtual disk encryption system and technology," Journal of Computer Applications, Nov. 2009, vol. 29, No. 11.

Q Archive, "Data Security and Disk Encryption Software Creates virtual encrypted disk on your system," http:// encrypted-disk_qarchive.org/, Accessed on: Apr. 30, 2010.

Shinder, "What is Dynamic Virtual Client Computing? or, What's the Problem with VDI and Why XP Mode is a Good Thing," WindowsNetworking.com, Sep. 08, 2009, TechGenix Ltd., http://www.windowsnetworking.com/articles-tutorials/ netgeneralNVhat-Dynamic-Virtual-Client-Computing-Whats-Problem-VDI-Why-XP-Mode-Good-Thing.html, Accessed on: Apr. 22, 2010.

Suzaki et al., "TPM + Internet Virtual Disk + Platform Trust Services = Internet Client," ASPLOS '08, 2008, http:// www.openlab_jp/oscirclar.

Van Hensbergen et al., "Dynamic Policy Disk Caching for Storage Networking," IBM Research Report, Nov. 28, 2006, IBM Research Division.

VMware, "VMware Workstation 6.5 Beta Release Notes," ACE Management Server Administrator's Manual, Aug. 14, 2008, Workstation Version 6.5, VMware, Inc., http://www.vmware.com/products/beta/ws/releasenotes_ws65_beta.html, Accessed on: Oct. 3, 2014.

Youngssoft, "CCBoot," Diskless Boot WinXP/Win2003/Vista/Win2008 with iSCSI, 2009.02, Quick Start, www.ccboot.com.

\* cited by examiner

DEPLOYING AN OPERATING SYSTEM

CROSS-REFERENCE TO RELATED APPLICATIONS

The present application claims priority pursuant to 35 U.S.C. §119(a) from European Patent Application No. 10425138A, filed on Apr. 27, 2010, which is incorporated herein by reference in its entirety.

BACKGROUND

Aspects of the present invention relate in general to computer operating systems, and more particularly, to methods for deploying those operating systems. Deploying an operating system to a computer is usually achieved by transferring an operating system image to a local disk of the computer on which the operating system is to be installed. The operating system image may be transferred either through a network or an attached local device. When using a network, the operating system image is transferred to the computer using a network boot capability such as peer exchange (PXE). A boot loader is then used to initialize the environment such that the necessary part of the operating system can be loaded into the main memory of the computer. Alternatively, the computer may boot from an attached device such as a Universal Serial Bus (USB) storage device. Both the boot loader and the operating system image are transferred from the storage device to the local hard disk of the computer. The operating system, once running, enables itself such that it can access the unread parts of the operating system image that have been transferred to the local disk.

BRIEF SUMMARY

A method for deploying an operating system onto a client system includes, with the client system, receiving a bootloader image from an external device in response to a request for the bootloader image and with the client system, installing the bootloader. The installed bootloader is configured to provide a streaming function from the client system to both a client repository of the client system and a remote data repository and selectively redirect requests for a block of data to one of: the client repository and the remote data repository. The method further includes, with the client system, during operation of a function of the operating system, making a request for a data block of the operating system, the data block including the function, and with the client system, receiving the data block from one of the client repository and the remote repository based on availability information.

A client computing system includes a processor and a memory communicatively coupled to the processor. The processor is configured to receive a bootloader image from an external device in response to a request for the bootloader image and install the bootloader. The installed bootloader is configured to provide a streaming function from the client system to both a client repository of the client system and a remote data repository and selectively redirect requests for a block of data to one of: the client repository and the remote data repository. The processor is further configured to, during operation of a function of the operating system, make a request for a data block of the operating system, the data block including the function, and receive the data block from one of: the client repository and the remote repository based on availability information.

A computer program product for operating system deployment includes a computer readable storage medium having computer readable code embodied therewith. The computer readable program code includes computer readable program code configured to receive a bootloader image from an external device in response to a request for the bootloader image; computer readable program code configured to install the bootloader. The installed bootloader includes computer readable program code configured to provide a streaming function from the client system to both a client repository of the client system and a remote data repository and computer readable program code configured to selectively redirect requests for a block of data to one of: the client repository and the remote data repository. The computer readable program code further includes computer readable program code configured to, during operation of a function of the operating system, make a request for a data block of the operating system, the data block including the function and computer readable program code configured to receive the data block from one of: the client repository and the remote repository based on availability information.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
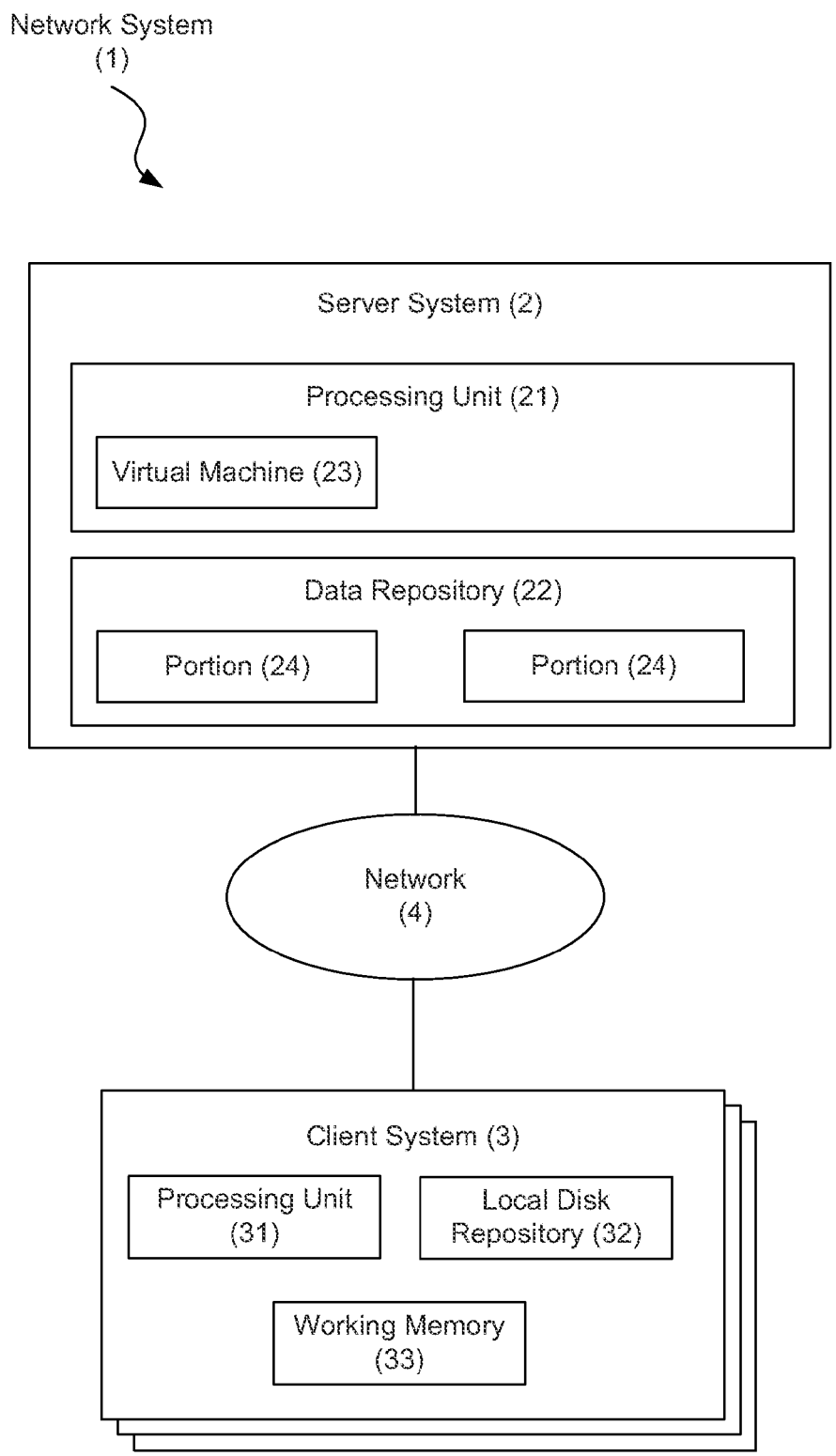
FIG. 1 is a diagram showing an illustrative network system for deploying an operating system, according to one example of principles described herein.

The present specification discloses methods and systems for efficiently deploying an operating system to a computer. When an operating system is deployed by streaming, only a minimal part of the operating system image is actually copied from the external device. This minimal part of the image includes just enough functionality to allow the operating system to start running and start accessing the remaining storage locations of the operating system image. Alternatively, the operating system image can be initially located at the external device such that the access to the image is attained through a special streaming function. This streaming device is part of the minimal part of the operating system image that is initially installed. The streaming function accesses the blocks of the remote operating system image when required and serves them to the running operating system. Preferentially, the external device can trace the disk access patterns in order to determine which blocks are required to achieve specific functionalities.

In such a system, from the point of view of the operating system, the behavior of the system appears entirely normal. The streaming device also stores the blocks on the local disk such that they can be accessed using an addressing schema identical to that of the remote disk (accessible via the network). In this case, the copying of the blocks onto the local disk during the initial deployment creates a local replica of the operating system image allowing subsequent access to blocks on disk to be performed quickly and efficiently. It can furthermore be provided that the streaming device requests the transmission of a block from the server on a case-by-case basis whenever the resources of the server, computer and network would otherwise be underused.

Eventually, the entire operating system image is copied to the computer. At this point in the basic scenario there is no further need for the server and the streaming function might even be removed. Having performed such a streaming deployment, the external device from which the operating system was deployed has at its disposal the disk access pattern that the operating system has used during the deployment, This allows the identification of a working set of blocks that can be included in a minimal initial deployment of such an operating system. Since these blocks depend on the application used, different working sets, such as an application Server working set, a Session initiation Protocol (SIP) server working set etc., can be identified.

As the streaming device is added to the operating system both virtual and physical machines can be streamed in this way. This can be advantageous in an environment which provides access to support both physical and virtual machines as a single mechanism, or in one where different virtualization platforms are used.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to the figures, FIG. 1 shows a block diagram of a network system (1) that includes a server (2) and a plurality of client computers (3) communicatively connected to the server (2). The server includes an operating system image (OS image) which is to be deployed onto the client systems (3). In some cases, the OS image may be a generic image that includes both the operating system and a software stack. A software stack is a set of software applications and sub-applications that may accompany an operating system. These additional applications may provide additional features and functionality to the computing system. For purposes of explanation, the process by which an operating system is deployed will be described for one client system (3) only. Although FIG. 1 illustrates the case where an operating system is deployed from a server connected over a network, the methods embodying principles described herein will also apply to cases where an operating system is deployed from a locally attached storage device such as a USB storage device. In such cases, the client system (3) may boot from the locally connected storage device rather than the server system (2).

The server system (2) includes a processing unit (21) and a data repository (22). The data repository may also be referred to as a remote data repository or a server repository. The processing unit (21) is capable of running a management virtual machine (23) on the OS image stored in one of a plurality of portions (24) of the data repository (22) in order to isolate this process from the platform where the server's own operating system (2) runs. The virtual machine (23) has access to at least the portions (24) of the data repository (22) for the OS image in which one or more OS images are stored. For example, the virtual machine (23) can mount the respective portion(s) of the data repository (22) to mount the respective kind of OS image. Thereby, native access to the OS image can be provided without the need for an implementation of file system drivers.

Furthermore, data elements required to boot the operating system can be obtained by the virtual machine (23). These data elements can include, for example, a Linux® system, a compressed kernel binary present in the OS image, and a compressed initial RAM disk on a Linux system, and the blocks of the files in the image necessary to boot, packaged in a binary format container on a Windows® system. Linux is a registered trademark of Linus Torvalds in the United States, other countries, or both, Microsoft, Windows, Windows NT, and the Windows logo are trademarks of Microsoft Corporation in the United States, other countries, or both. The files necessary to boot an operating system may be obtained by installing the image of those files on the local hard disk of a virtual (or physical) machine and then booting the machine with the Windows Pre-Installation (PE) environment. Windows PE is a minimal installation environment with reduced services that may be used to install modern versions of Windows. From Windows PE, other tools may be used to obtain the blocks from the disk that belong to the files needed by Windows to boot.

The virtual machine (23) extends the OS image using OS-specific tools adapting the OS image to the size of the client disk (the information of which is provided from the server side). The resized OS image is stored in one portion (24) of the data repository (22) and is made available as an image target such as an internet Small Computer System Interface target (iSCSI target) to the server system (2). Alternatively, the file system may be modified dynamically at an early stage of a streaming deployment.

The client system (3), having a processing unit (31) and a local disk repository (32), is connected to the server system (2) via a network (4). The local disk repository may also be referred to as a client repository. The processing unit (31) also has access to a working memory (33) such as a RAM.

Figure 2:
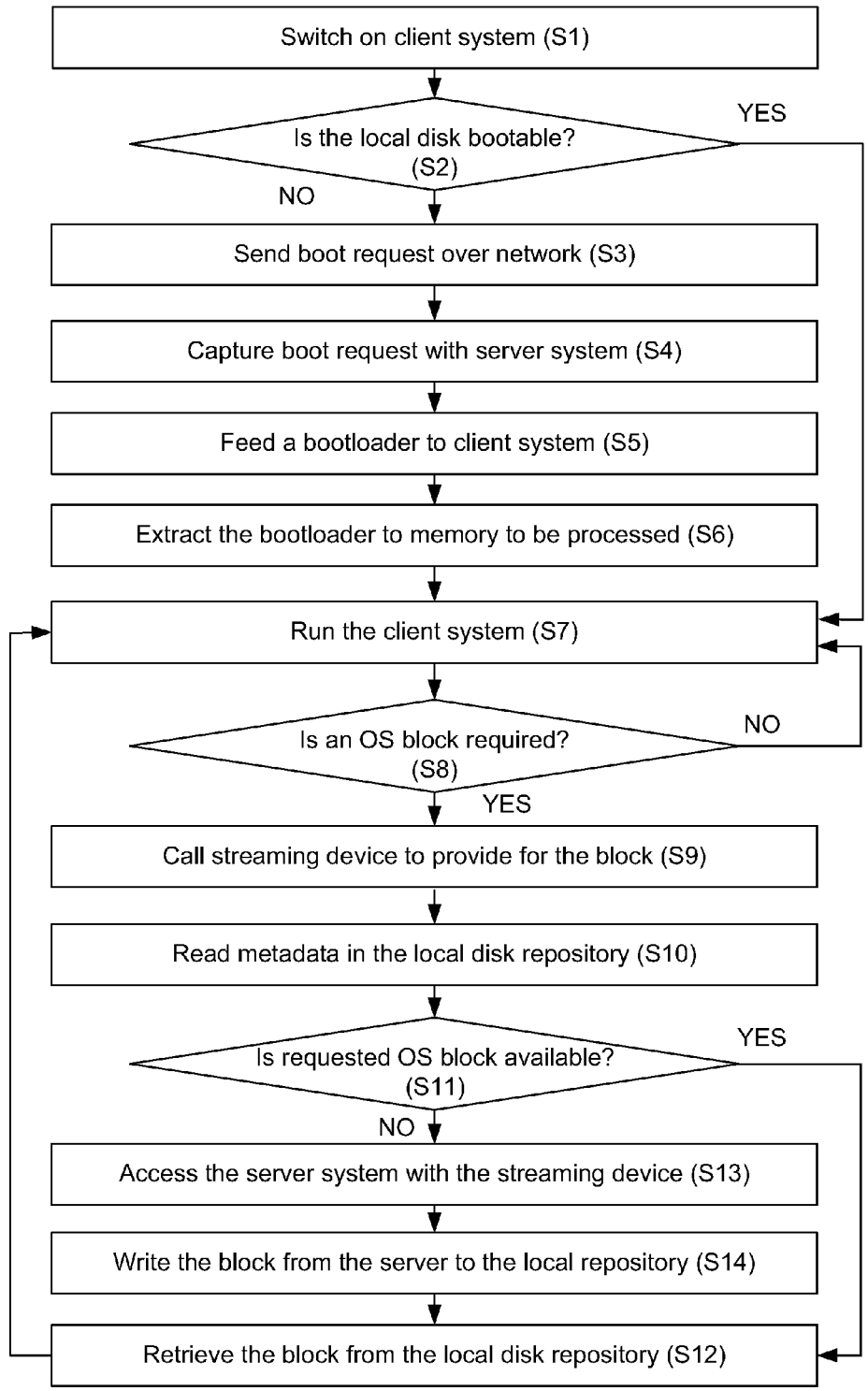
FIG. 2 is a flowchart showing an illustrative method for deploying an operating system on a client computer, according to one example of principles described herein.

FIG. 2 is a diagram showing an illustrative method for deploying an operating system to a client system (e.g. 3, FIG. 1). At step S1, the client system (3) is switched on and tries to boot. At step S2, it is determined whether a local bootable disk is available. If there is no local bootable disk available (S2, No), then the system attempts to boot over the network (4). To achieve this, a boot request is sent over the network (4) in step S3 by applying a suitable network protocol which may address any device which can support the boot process. If a booting from the local disk is possible (S2, YES), then the process moves on to step S7 which will be described below.

The server system (2) captures this attempt by receiving the boot request in step S4. This is usually done by means of a Dynamic Host Configuration Protocol (DHCP)—server running on the server system (2). In response, the server system (2) feeds a network bootloader to the client computer (3) in step S5. A network bootloader may be, for example pxelinux, gPXE, IBM Tivoli Provisioning Manager for OS Deployment agent or reduced versions thereof. The network bootloader is received by the client computer (3) and stored as an initial RAM disk image (bootloader image) which can be used to boot the client computer (3).

After the bootloader image has been received in the client computer (3) the received bootloader image is extracted to working memory (33) and processed in step S6. The bootloader image sets up a bootable partition on the local disk repository (32) and installs the functions necessary to perform a local boot procedure, on the local disk repository (32).

The installed bootloader image contains an initiator such as an iSCSI initiator that allows access to the image target, such as the iSCSI target, on the server system (2) and thus makes the remote or external OS image locally available on the client computer (3).

The bootloader image (initial RAM disk image) further includes a streaming function which is initialized to work with the virtual disk generated by the initiator and the local disk. The bootloader image may include a streaming device driver that implements a streaming function. The streaming device providing the streaming function has access to a metadata structure on the local disk repository (32). The metadata structure is provided to indicate data blocks of the operating system available on the local disk repository (32).

When running the client computer (3) in step S7, and when it is determined in step S8 that a specific block of the operating system is required (S8, Yes), the streaming device is called to provide the respective block of the operating system in step S9. A block of the operating system can be any data item, such as a data file, a group of data files, a data module, a data directory, combinations thereof and the like. When requesting a specific block, the streaming device reads the metadata on the local disk repository in step S10 in order to determine whether the specific block of the operating system required by the processor (31) can be retrieved from the local disk repository (32) or not. If it is determined in step S11 that the requested block is available on the local disk repository (32) (S11, Yes), it is retrieved the local disk repository in step S12.

If it is determined in step S11 that the requested block is not available on the local disk repository 32 (S11, no) the streaming device accesses the server system (2) via the initiator in order to download the requested block of the operating system in step S13. Thereby, parts or blocks of the operating system can be retrieved through the initiator from the server system (2) on demand as they are requested by the bootloader or a part of the operating system that is already installed on the client computer (3). Upon reception, the retrieved blocks of the operating system are written onto the local disk repository (32) in step S14 and returned to the calling function.

According to another aspect, the client computer may boot from a locally attached storage device. Parts or blocks of the operating system can then be retrieved through the initiator from the locally attached storage device on demand as they are requested by the bootloader or a part of the operating system that is already installed on the client computer (3).

As a consequence, when the operating system requires functions that are included in data running blocks which are not locally available, the respective data blocks are obtained from the server system (2). When the data blocks are received on the client computer (3) they are both stored onto the local disk repository (32) and processed by the bootloader or operating system already running, respectively. Hence, the more contents of the operating system image are made available on the local disk repository (32), the more the client computer (3)

can become independent of the server system (2) or the network connection to the server system (2).

Since the bootloader image received from the server system (2) has also been installed onto the local disk repository (32), the client computer (3) can subsequently boot directly from the local disk repository (32) instead of booting via the network (4). Given that the initial images of the operating system are the same as the images of the first boot process, the operating system is set up exactly the same. Thus, the operating system will still access the local disk repository through the streaming device. Most of the necessary elements of the operating system are then locally available. Missing blocks of the operating system can further be retrieved at any time from the server system (2) as long it is connected, When the client computer (2) has all the blocks of the operating system it will ever need for normal operation, the connection to the server system (2) becomes obsolete and can be completely removed. This may be done by installing the original kernel and image from the OS image in the local disk repository. This might require booting the client computer (3) and from there on the accesses to the local disk will be performed directly, thereby circumventing the streaming device.

As an alternative, it can be provided that the streaming device is not removed after the deployment of the operating system. The streaming device can then be reused for mirroring simply by performing the same operation on the local disk repository (32) and on the repository (22) on the server system (2). Write operations onto the local disk repository are then mirrored to the repository (22) of the server system (2) such that differences to the originally deployed image on the client computer (3) can be maintained on the server side. The mirrored replication of the data blocks written to the local disk repository can be compressed and/or encrypted. In some implementations, the replication is encrypted such that said external device is unable to read the state of data blocks modified by said client system. The server system (2) then has a stored copy of the data written the local disk repository (32) of the client computer (3). This allows that data to be used for recovery purposes. Additionally, the copy of the written data could itself be deployed in order to allow users to work remotely without having to transport their computer. For example, a user could boot another computer remotely via the virtual disk on the repository (22) containing the copy of the written data located on the server system (2).

Similarly, if the streaming device is not removed after deployment of the operating system, the server system (2) can update the OS image locally on the server system (2) and then inform all client computers (3) that certain blocks have expired or are invalid. Then the metadata about the local availability of the blocks can be updated such that a block indicated as being available on the client computer (3) is overwritten such that the metadata indicates that the respective block is invalid or not available on the local disk repository (32). The client computers (3) can have an installed a routine to re-fetch the required blocks from the server system (2) so that the server system (2) can update the OS image of a running remote operating system.

In some cases, after the OS image has been completely deployed to the client system, the streaming device may be removed from the client system. The client system will then operate normally without the use of the streaming mechanism to access particular components of the operating system.

The information about which data blocks are stored locally in the local repository and which are stored or to be retrieved remotely in/from the server repository may be kept in a location table. The location table can be stored on the predefined space of the local repository such that the streaming device can access it securely. In the case that the entire location table on the disk of the local repository is larger than the available working memory on the client computer, the location table may be broken into chunks such that some small number of chunks may be held in the working memory of the client computer. Hence, the chunks can be brought into memory and written hack to the local repository as required. In one embodiment, the location table may be implemented as a bitmap, such that 1 bit represents a disk sector of a specific size, such as 512 bytes.

While above embodiment has been described by using a direct network connection in a client server network system, also a peer-to-peer model of deployment is possible, in which the required blocks are not requested from the server system (2) but from any peer that already possesses them. This allows the server system (2) to parallelize the block distribution enabling a much larger number of clients to be deployed an operating system at a time. For example, a client computer (3) obtains from a server system (2) a list of a plurality of other client computers (3) that have installed or that are installing the OS image. The client's streaming device is then adapted to connect to at least one of these other client computers (3) via the network such that the client computer 3 can speed up the deployment of the required blocks of operating system by sending multiple requests for distinct blocks in parallel.

The above presented embodiments of the invention are in particular useful when an operating system is frequently being deployed and where it is likely that the operating system that is currently being deployed was already deployed to the same client computer 3. By not removing the blocks of an operating system which already had been deployed, it is possible for the streaming device to keep track of the blocks that have been erased and to find a required block on its own disk, thereby omitting the need to start a request to the server system 2.

Any disclosed embodiment may be combined with one or several of the other embodiments shown and/or described. This is also possible for one or more features of the embodiments.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for deploying an operating system onto a client system, the method comprising:
    with said client system, receiving a bootloader image from an external device in response to a request for said bootloader image;
    with said client system, installing said bootloader, said installed bootloader configured to:
        provide a streaming function from said client system to both a client repository of said client system and a remote data repository; and
        selectively redirect requests for a block of data to one of: said client repository and said remote data repository; and
    with said client system, during operation of a function of said operating system, making a request for a data block of said operating system, said data block including said function; and
    with said client system, receiving said data block from one of: said client repository and said remote repository based on availability information; and
    deactivating said streaming function and providing direct access to said client repository in response to a predetermined set of data blocks being received by said client system.

2. The method of claim 1, further discloses comprising, in response to said bootloader directing said request for said block of data to said remote data repository:
    retrieving said block of data from said remote data repository and writing said block of data to said client repository; and
    updating said availability information, wherein said availability information comprises an location table that indicates whether a data block of said operating system is at least one of: present or valid within said client repository.

3. The method of claim 1, wherein said external device sends update information indicating that one or more data blocks of said operating system are invalid by listing the one or more invalid data blocks in said availability information as being unavailable in the client repository.

4. The method of claim 1, wherein said bootloader image provides a boot function to allow the client system to boot from the client repository.

5. The method of claim 1, further comprising periodically retrieving, by the external device, data blocks from said client system which have been modified by said client system to form a replication.

6. The method of claim 5, wherein said replication is encrypted such that said external device is unable to read the state of data blocks modified by said client system.

7. A client computing system comprising:
    a processor; and
    a memory communicatively coupled to said processor;
    in which said processor is configured to:
        receive a bootloader image from an external device in response to a request for said bootloader image; and
        install said bootloader, said installed bootloader configured to:
            provide a streaming function from said client system to both a client repository of said client system and a remote data repository; and
            selectively redirect requests for a block of data to one of: said client repository and said remote data repository;
        during operation of a function of an operating system, make a request for a data block of said operating system, said data block including said function;
        receive said data block from one of: said client repository and said remote repository based on a location table;
        sending to said external device a disk access pattern that said client computing system used during deployment of said operating system from said remote data repository, said disk access pattern identifying a working set of data blocks used in a minimal deployment of said operating system.

8. The system of claim 7, wherein said processor is further configured to, in response to said bootloader directing said request for said block of data to said remote data repository:
    retrieve said block of data from said remote data repository and writing said block of data to said client repository; and
    update said location table.

9. The system of claim 7, wherein said location table indicates whether a data block of said operating system is at least one of: present or valid within said client repository.

10. The system of claim 7, wherein said processor is further configured to deactivate said streaming function and provide direct access to said client repository in response to a predetermined set of data blocks being received by said client system.

11. The system of claim 7, wherein said remote data repository is within an external device connected to said client system through one of: a local external connection and a network connection.

12. The system of claim 11, wherein said external device sends update information to said location table indicating that one or more data blocks of said operating system are invalid.

13. The system of claim 7, wherein said bootloader image provides a boot function to allow the client system to boot from the client repository.

14. The system of claim 7, wherein the external device periodically retrieves data blocks from said client system which have been modified by said client system to form a replication.

15. The system of claim 14, wherein said replication is encrypted such that said external device is unable to read the state of data blocks modified by said client system.

16. A computer program product for operating system deployment, said computer program product comprising:
- a non-transitory computer readable storage medium having computer readable program code embodied therewith, said computer readable program code comprising:
  - computer readable program code configured to receive a bootloader image from an external device in response to a request for said bootloader image;
  - computer readable program code configured to install said bootloader, said installed bootloader comprising:
    - computer readable program code configured to provide a streaming function from said client system to both a client repository of said client system and a remote data repository;
    - computer readable program code configured to selectively redirect requests for a block of data to one of: said client repository and said remote data repository;
    - computer readable program code configured to during operation of a function of said operating system, make a request for a data block of said operating system, said data block including said function;
    - computer readable program code configured to receive said data block from one of: said client repository and said remote repository based on a location table;
    - computer readable program code to store said data blocks on a local disk repository and concurrently process said data blocks by said operating system running on said client device; and
    - computer readable program code to update an old data block stored on said client system by:
      - indicating on said location table that said old data block stored on said client system is not available even though said old data block is stored on said client system; and
      - when said streaming device receives a request for said old data block, said streaming device retrieves an updated version of the old data block from said external device.

17. The computer program product of claim 16, further comprising, in response to said bootloader directing said request for said block of data to said remote data repository:
- computer readable program code configured to retrieve said block of data from said remote data repository and writing said block of data to said client repository; and
- computer readable program code configured to update said location table, wherein said location table indicates whether a data block of said operating system is at least one of: present or valid within said client repository.

18. The computer program product of claim 16, further comprising computer readable program code configured to deactivate said streaming function and provide direct access to said client repository in response to a predetermined set of data blocks being received by said client system.

19. The computer program product of claim 18, wherein said external device sends update information indicating that one or more data blocks of said operating system are invalid.

20. The computer program product of claim 16, wherein said bootloader image provides a boot function to allow the client system to boot from the client repository.

21. The method of claim 1, further comprising:
- tracing, by said external device hosting said remote data repository, disk access patterns of said client system; and
- determining which data blocks are required to achieve specific functionalities.

22. The method of claim 21, further comprising:
- storing, by said external device from which said operating system was deployed, a disk access pattern that said client system has used during deployment of said operating system; and
- identifying, by said external device, a working set of data blocks included in a minimal initial deployment of said operating system, in which said minimal deployment of said operating system comprises a streaming function and functionality to allow said operating system to start running and access remaining storage locations of the operating system.

23. The method of claim 1, in which said streaming function provides access to said remote data repository to support both physical and virtual machines as a single mechanism.

24. The method of claim 1, further comprising:
- after said client system has received all data blocks of said operating system used in normal operation of said client system, reusing said streaming functionality for mirroring an operating system of said client system on said external device by:
- mirroring write operations to said client repository to said external device.

25. The method of claim 24, further comprising accessing, by a separate computing device, mirrored data stored on said external device, said separate computing device replicating operation of said client system.

26. The computer program product of claim 16, further comprising computer readable program code to parallelize block distribution by:
- downloading, by a plurality of peer computing devices, data blocks of an operating system image from said external device and installing said operating system image on said plurality of computing devices;
- downloading, by said client system, a list of peer computing devices that have installed said operating system image; and
- connecting, by said streaming function on said client system, to at least two of said plurality of peer computing devices to make multiple requests for distinct data blocks in parallel.

* * * * *